Aug. 8, 1967 D. GOSSEL 3,335,348
MONOPHASE A.C. MOTOR PARTICULARLY FOR OPERATIONAL
CURRENTS OF HIGHER FREQUENCIES
Filed Sept. 2, 1964 4 Sheets-Sheet 1
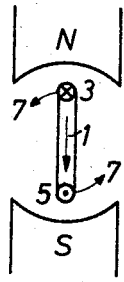
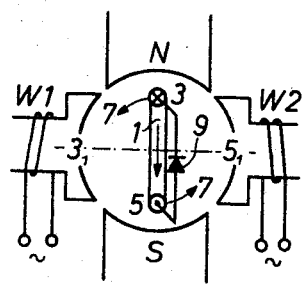
Fig. 1    Fig. 2
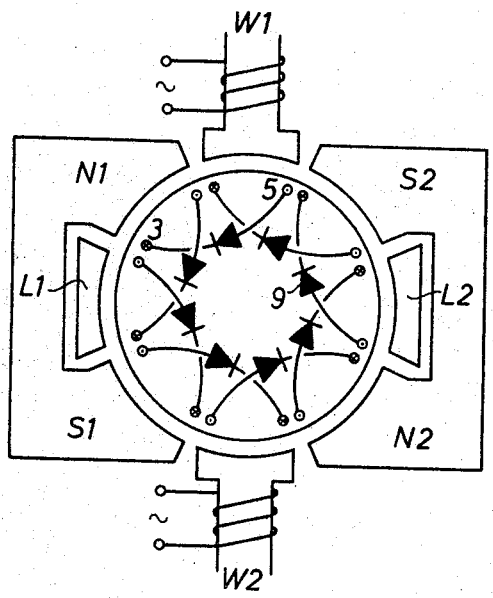
Fig. 3
INVENTOR.
DIETER GOSSEL
BY
AGENT

INVENTOR.
DIETER GOSSEL

INVENTOR.
DIETER GOSSEL
BY
AGENT

United States Patent Office 3,335,348
Patented Aug. 8, 1967

3,335,348
MONOPHASE A.C. MOTOR PARTICULARLY FOR OPERATIONAL CURRENTS OF HIGHER FREQUENCIES
Dieter Gossel, Hamburg-Lokstedt, Germany, assignor to North American Philips Company, Inc., New York, N.Y., a corporation of Delaware
Filed Sept. 2, 1964, Ser. No. 393,847
Claims priority, application Germany, Sept. 19, 1963, P 32,620
11 Claims. (Cl. 318—244)

The present invention relates to a single phase A.C. motor, more particularly to an A.C. motor adapted for use with operational currents of relatively high frequencies and comprising at least two alternating field poles and a rotor, the conductor circuits of the rotor including rectifiers which are traversed by pulsating by the currents induced by the alternating field.

Electric motors may be divided approximately into two groups, i.e., rotary-current motors and commutator motors. Rotary-current motors operate without reversal of the current and they can be operated without any direct contact with the rotor. Examples of such motors are the induction motor with short-circuited rotor winding and the synchronous motor with permanent magnet rotor. These motors are particularly advantageous owing to the absence of contacts and to their rugged construction, but they start with difficulty and the speed thereof is not easily controlled. Their speed depends in the first place upon the frequency of the operational current.

Commutator motors supply a high starting torque and their speed can be controlled in a satisfactory manner. They are, moreover, suitable for monophase operation. However, in these machines, particularly large machines with A.C. supply, the commutator gives rise to great difficulties, inter alia due to the commutator short-circuit losses, to sparking of the brushes and to the resultant wear, to the deposition of dirt on the pole reversing laminations and to the restriction of their use to low operational voltages.

Attempts have been made to obtain a motor which incorporates both the advantages of the rotary current motors and those of the commutator motors.

It is known to include rectifiers in the rotor winding of a separately driven generator of an amplifying machine. The alternating field induced in the rotor by a stator alternating field is thus rectified and reacts upon the stator, so that an alternating field is again produced, which is finally rectified for feeding a load. Such a device cannot be used as a driving motor.

Furthermore, a unipolar electric machine is also known in which the current obtained from a rotor loop is rectified by means of a rectifier. The device described does not, however, constitute a useful motor.

A starting control for synchronous motors is also known in which the rotor winding is short-circuited as long as the motor is starting and synchronism has not yet been attained (asynchronous starting). When the motor approaches the synchronous speed, the supply is performed via rectifying tubes (synchronous running). However, with this known construction, the speed of rotation cannot be controlled. In accordance with the invention, the advantages described are obtained with a monophase A.C. motor, particularly for operational currents of higher frequencies, having at least two alternating field poles and one rotor. The conductor circuits of the rotor include rectifiers which are traversed by pulsating currents induced by the alternating field. The stator further comprises two pairs of direct field poles for each pair of alternating field poles. A pair of direct field poles of opposite polarity are arranged between successive alternating field poles. The direct field poles of each pair surround a free pole having a magnetic circuit which closes via the rotor. There also is provided a number of distributed conductor circuits or rotor windings corresponding to the number of poles and having each a winding width equal to about twice the pole pitch.

This motor, which does not include any current reversing laminations and connecting rings likely to cause perturbations, has a large starting torque and its speed corresponds with that of D.C. shunt motors. In fact, the maximum torque is obtained at the start. Since the speed of this monophase A.C. motor depends upon the operational voltage as well as upon the intensity of the stator-field, but not upon the frequency, applications are possible in all kinds of controlled or non-controlled drives which have to start in a loaded state. A construction without contacts signifies that for all practical purposes the motor does not require any servicing, that the wear is slight, and that it does not produce electrical interference.

The stator of the motor according to the invention can be sealed completely from the rotor and may even be encapsulated in a closed shell, which may be filled with oil. With the exception of the rotor, there are no movable parts; there are only stationary openings for conductors, as is usual in transformers, so that the motor can be directly connected to supply lines of medium voltage values. The start can be controlled by tappings on the windings of the alternating field. This is particularly important with a view to A.C.-driven electric railways, since the conventional transformation of the voltage of the line to the operational voltage of commutator motors can be eliminated.

The motor is, moreover, suitable for use as a series motor or as a compound motor, providing due care is taken to maintain the correct phase relation between the stator field and the rotor field.

The field of application of the motor according to the invention is mainly to be found where operational currents of higher frequencies are available. In such a case the stator and/or the rotor are preferably made of a ferrite material.

The separate windings of the motor are not supplied uninterruptedly, but intermittently. This intermittent supply does not give rise to disturbances, since there is a sufficient number of windings and there is always at least one winding which imparts a driving torque to the rotor.

The invention will be described more fully with reference to the embodiment shown in the drawing.

FIG. 1 shows the principle of a known D.C. shunt motor.

FIG. 2 shows such a motor with inductive rotor supply.

FIG. 3 shows a motor according to the invention.

Figure 4:
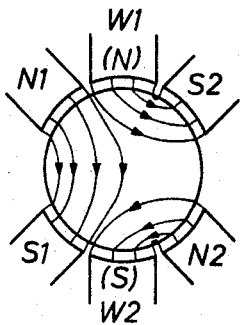
FIGS. 4 to 6 show the field variation of the motor according to the invention.

FIG. 1 illustrates the operating principle of a D.C. shunt motor. In the motor of FIG. 1, if a conductor loop 1 is located in a magnetic field between a north pole N and a south pole S, the conductors 3 and 5 of this loop are subjected, when a current is supplied from the outside, to forces indicated by the arrows 7, which cause the loop and hence the rotor to move.

When the current passing through the loop 1 is supplied across a commutator, the current through a conductor located just opposite the north pole N is always directed into the plane of the drawing and the current through the other conductor 5, simultaneously located just opposite the south pole S, is always directed out of the plane of the drawing, the torque imparted to the loop is always in the same direction.

When the current supply is switched off by means of a switch, and when the conductor loop is connected to connecting rings, instead thereof, a levorotatory torque is obtained as long as the conductor 3 is opposite the N-pole and the conductor 5 is opposite the S-pole. However, the torque reverses its direction immediately after the conductors have passed through the space between the poles and the conductor 3 is located opposite the S-pole and the conductor 5 opposite the N-pole.

Owing to this constant alternating direction of the torque, a continuous rotation in one direction cannot be obtained.

One possible solution to the problem is to interrupt the supply of the rotor at the instant when the torque will reverse its direction. It will be supposed that the loop is in the starting position shown in FIG. 1. Owing to the rotational forces 7 acting upon the loop 1, the rotor will start rotating in a counterclockwise direction. As soon as the conductor 3 is located in the space between the poles and before it has arrived at a position opposite the S-pole, at which point it is subjected to a reverse force, the rotor current is switched off. As a result of the kinetic energy accmulated therein, the rotor continues rotating without being driven until the conductor 3 has also traversed the second space behind the S-pole. At this instant, the current is again switched on. As a result, the conductor loop receives an accelerating moment in the original direction. Switching on and off may be performed by means of connecting rings which are conductive only over half of their circumferences.

The principle of an intermittent supply is applied to the motor according to the invention, but also the connecting rings are dispensed with. The omission of the connecting rings means that an inductive rotor supply must be used instead of a direct rotor supply. To this end the stator comprises, not only the N- and the S-poles, but also alternating field poles W1, W2 diametrically opposite each other, between which an alternating field is produced. This alternating field induces an alternating voltage in the conductor loop 1, initially considered to be short-circuited. In this form the device is not yet suitable for use as a motor, since the current through the conductor loop periodically changes its direction, so that the rotational force 7 also changes its direction. As a consequence the loop will start oscillating.

By including a rectifier 9 in the short-circuited conductor loop (FIG. 2) the direction of the current is fixed. The alternating current passing through the conductor loop thus becomes a pulsatory direct current. Accordingly, pulsatory forces 7 are produced which impart to the rotor a common torque in the counterclockwise direction owing to the aforesaid undirectional current flow produced by means of the rectifier. The device shown in FIG. 2 operates on the same principle as that of FIG. 1, apart from the pulsatory currents, forces and torques. However, it does not exhibit a suitable switching on and off of the rotor current according as the rotor conductors are located just opposite those poles in which they should either be idle or convey current.

With the motor structure shown in FIG. 3, switching on and off is obtained by means of a variable coupling between a given loop and the alternating field which depends upon the position of the loop with respect to the poles of the alternating field.

In the motor shown in FIG. 3, the cylindrical surface surrounding the rotor is divided into eight equal portions of $\pi/4$ each. Each of these parts has a pole, which include two alternating field poles W1 and W2, four direct field poles N1, S1, N2, S2 and two magnetically floating or free poles L1, L2, the effect of which will be described hereinafter. The rotor has at least eight windings along chords, each of them being short-circuited through a rectifier, preferably a diode. The width of each individual winding is equal to twice the external pole pitch.

Figure 5:
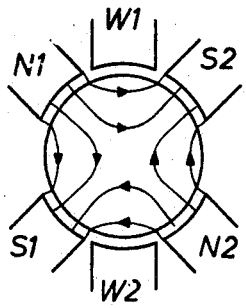
Figure 6:
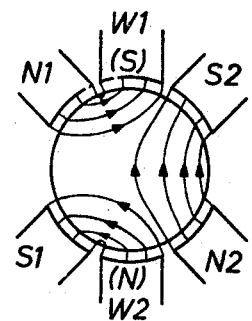

When the upper alternating field pole W1 is a north pole and the lower alternating field pole W2 is a south pole, the field distribution shown in FIG. 4 is obtained between the stator and the rotor. For the period which no alternating field is prevailing between the poles W1 and W2, a field distribution of the kind shown in FIG. 5 is obtained. If the alternating field pole W1 is a south pole and the alternating field pole W2 a north pole, the field distribution is that of FIG. 6.

Figure 7:
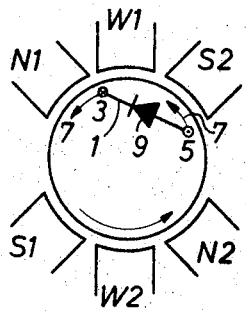
FIGS. 7 to 11 show the operation of the motor according to the invention for a low rotor speed.
Figure 8:
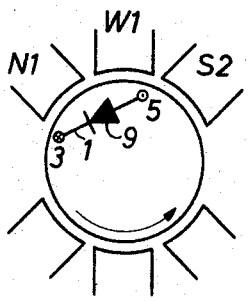

If it is first assumed that the rotor has only one conductor loop 1, and if it is further assumed that the rotor moves only very slowly, the driving effects shown in FIGS. 7 to 11 are obtained. In FIG. 7, the conductor loop 1 is completely coupled with the alternating magnetic flux passing through the poles W1 and W2. Consequently, a maximum short-circuit current flows in the pass direction of the diode 9. Since, as is shown in FIG. 7, the rotor conductor 3 is opposite the pole N1 and the rotor conductor 5 opposite the pole S2, the forces indicated by the arrows 7 are produced. These forces are operative on the conductor loop and start the rotor.

After a turn of the conductor loop through 45° (FIG. 8) the rotor conductors 3 and 5 have turned out of the range of the direct field. Therefore, driving forces are no longer operative on the rotor conductors. However, the rotor continues rotating, since in the meantime other rotor conductors of other conductor loops (for the sake of simplicity not shown in FIGS. 7 to 11) have turned into the pole ranges concerned, so that they are subjected to a driving torque.

Figure 11:
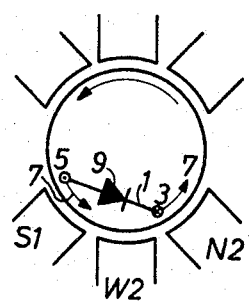

The coupling of the conductor loop 1 with the alternating field gradually decreases to zero upon a further turn of the rotor through 45° (FIG. 9) so that when the conductors 3 and 5 enter the forbidden zone, i.e. where they would be exposed to an opposite torque, no current passes through the conductors, which are therefore not exposed to a reverse force. After the forbidden zone has been passed (FIG. 10), the coupling of the conductor loop 1 with the alternating field increases again. This field once again induces a unidirectional current in conductor loop 1. A second operative phase starts in which the conductor 3 is in front of the pole N2 and the conductor 5 is in front of the pole S1. The conductor loop is again subjected to a driving torque (FIG. 11).

When the rotor is operating at high speed, generator effects are added to the aforesaid driving effects. In this case the direct field poles N1 and S2 induce in the rotor conductors 3 and 5 a counter-voltage, which is polarised in the blocking direction of the diode. Accordingly, the diode will pass a current only as long as the alternating voltage induced by the alternating field poles W1 and W2 in the conductor loop remains higher than the counter-voltage. In this way, like with a D.C. shunt motor, the rotor finally reaches a no-load speed at which the counter-voltage is almost equal to the alternating voltage and only a small surplus of alternating voltage is available to compensate for the losses of the unloaded motor. When the conductor loop has moved out of the position shown in FIG. 8, the counter voltage is no longer induced in the conductors 3 and 5. The coupling with the alternating field poles W1 and W2 has also decreased, it is true, but it is still effective and brings about an increase of the leakage inductance of the conductor loop 1. The pulsatory direct current passing through the conductor loop, up until it has reached the position of the conductors shown in FIG. 9, produces a magnetic field and prevents the production of heat losses.

Figure 9:
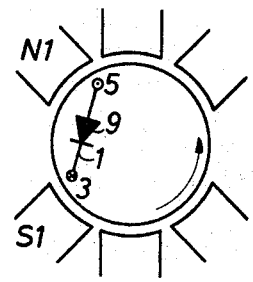
Figure 10:
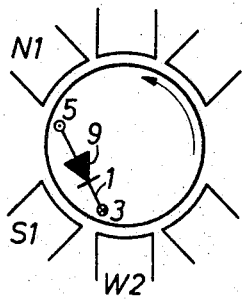
Figure 12:
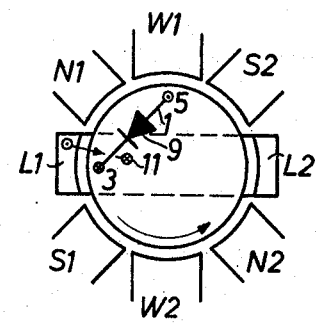
FIGS. 12 to 15 show the operation of the motor for a high rotor speed.
Figure 13:
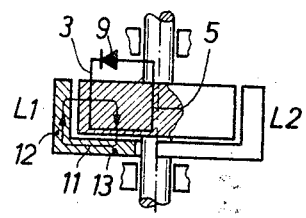

When the conductors of the rotor enter the forbidden zone of opposite torque, as shown in FIG. 9, the direct field poles N1 and S1 again induce a counter-voltage therein, which is now polarised in the pass direction of the diode. The ohmic current thus produced would in turn produce heat losses if precautions were not taken to keep the winding inductive so that it is thus capable of producing its own magnetic field. This production of a magnetic field is rendered possible by providing magnetically floating or free poles L1 and L2 between the direct field poles (FIG. 12). The leakage flux 11 can now flow through the substantially closed magnetic circuit provided by the free poles L1 and L2. FIG. 13 shows a suitable yoke-rotor structure in which the yoke 12 extends up into the vicinity of the rotor iron.

All windings that are simultaneously out of their operative phase produce fluxes 11, which are directed towards the interior of the rotor. These fluxes would neutralise each other if they were not individually magnetically closed separately through the limbs 13 of the free poles L1 and L2 facing the rotor iron. The motor structure obtained by the measures described above for protecting the rotor from heat losses has the further advantage that the energy produced in the conductor loop outside the operative phases is stored in the form of magnetic energy and is subsequently available for driving the rotor as soon as the operative phases are again reached.

Figure 14:
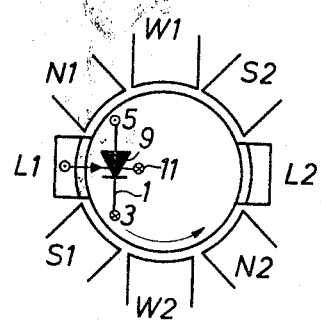
Figure 15:
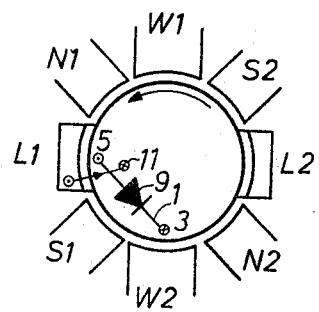

FIGS. 12, 14 and 15 show successive conductor positions for a further rotor rotation, from which it is apparent that the leakage flux 11 through the free pole L1 increases, passes through a peak value and then decreases.

Figure 16:
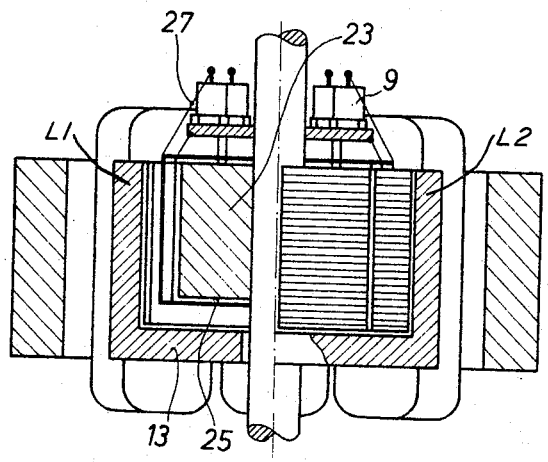
FIGS. 16 and 17 show a construction of the motor.
Figure 17:
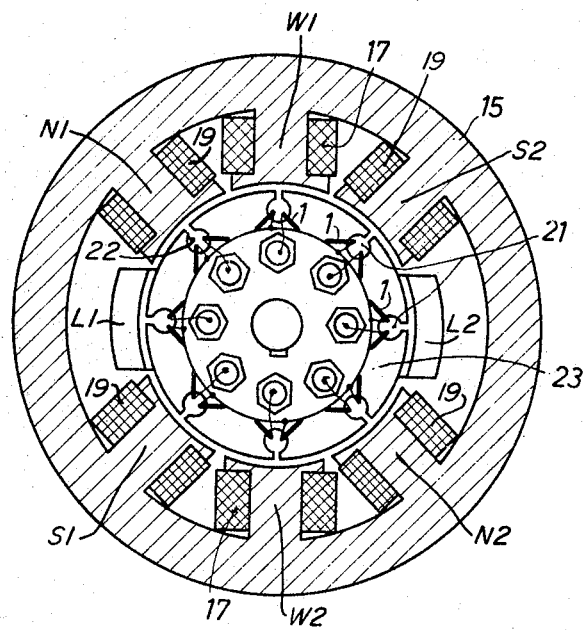

FIGS. 16 and 17 finally show an embodiment of the motor according to the invention. The stator 15 of the motor is provided with six poles, i.e. two alternating field poles W1 and W2 and four direct field poles N1, S1, N2, S2. The alternating field poles W1 and W2 are provided with alternating current windings 17 and the direct field poles are provided with direct current windings 19. The windings 19 may be replaced by permanent magnets, which are incorporated in the poles. The stator 15 furthermore comprises the free poles L1 and L2 including the limbs 13, which are bent over and across the bottom side of the motor towards the shaft of the rotor. The grooves 21 of the rotor accommodate the windings 1 along chords. Through recesses in the rotor 23, which is preferably made of ferrite, the winding head 25 is arranged on the bottom side of the rotor 23 so that the limbs 13 are located most closely to the lower head face of the rotor. The upper winding head 27 is located outside the rotor 23. The winding head 27 is also provided with the diodes 9, which are included in the separate turns. The motor shown in FIGS. 16 and 17 is provided with eight diodes and hence also with eight windings closed in themselves.

The principle of the motor is illustrated in a simplified form in an electromagnetic converter to the input of which is supplied electric energy and the output of which supplies mechanical energy. The shaft of the motor is set rotating by the electric energy and reacts on the input side and controls the motor in the manner known with a commutator machine, however, without comprising, in fact, a mechanical commutator.

What is claimed is:

1. A single phase A.C. motor comprising a stator having at least two spaced alternating field poles, winding means for producing an alternating magnetic field in said poles, said stator further comprising two pairs of direct current field poles for each pair of alternating field poles, a rotor in operative relation to said field poles comprising a plurality of windings each of which comprises first and second active conductors interconnected with a rectifier element to form a closed circuit in which a varying unidirectional current is induced by said alternating field, said D.C. field poles being arranged about said stator in pairs of opposite polarity between adjacent ones of said alternating field poles, and magnetic means arranged between the poles of each pair of D.C. field poles to provide a plurality of magnetically floating poles, each of said floating poles being arranged to cooperate with said rotor to provide a substantially closed magnetic path, the spacing between said first and second active conductors of each of said rotor windings being approximately twice the pole pitch.

2. A motor as described in claim 1 wherein said rotor further comprises a magnetic core of ferrite material.

3. A motor as described in claim 1 wherein said rotor and stator are coaxially arranged and the stator field poles are circumferentially arranged thereabout in the following order: an alternating field pole, a D.C. field pole of one polarity, a magnetically floating pole, a second D.C. field pole of opposite polarity, a second alternating field pole, and so on.

4. A motor as described in claim 1 wherein the number of said rotor windings is at least equal to the number of stator poles.

5. A motor as described in claim 2 wherein said magnetic means comprises a first elongated portion extending parallel to the longitudinal axis of said rotor and a second portion bent over to extend close to and substantially parallel to one end face of said rotor.

6. A single phase A.C. motor comprising a rotor having a plurality of windings each of which comprises a pair of circumferentially spaced active conductors, a plurality of rectifying elements, means connecting said rectifying elements individually in series circuit with corresponding pairs of said active conductors to form a plurality of closed rotor windings in which current can flow in only one direction, a stator coaxially arranged about said rotor comprising at least two circumferentially spaced alternating field poles for producing an alternating magnetic field, two pairs of direct current field poles for each pair of alternating field poles, said D.C. field poles being circumferentially spaced apart and arranged in pairs of opposite polarity in the interpolar space between adjacent ones of said alternating field poles, and magnetic means positioned in the interpolar space between the poles of each pair of D.C. field poles to provide a plurality of magnetically floating poles arranged so that the magnetic path thereof closes via the rotor, the spacing between the active conductors of each of said rotor windings being approximately equal to twice the stator pole pitch.

7. A motor as described in claim 6 wherein the number of said rotor windings corresponds to the number of stator poles.

8. A single phase A.C. motor comprising a stator having at least two alternating field poles for producing an alternating magnetic field, a rotor operatively disposed relative to said stator and comprising a plurality of windings each of which comprises a pair of active conductors interconnected with a rectifying element so that a pulsating current is induced therein by said alternating field, said stator further comprising two pairs of direct field poles for each pair of alternating field poles, said direct field poles being arranged in pairs of opposite polarity between successive alternating field poles and surrounding a free pole in which the magnetic circuit closes via said rotor, the number of said rotor windings corresponding to the number of poles and being distributed about the rotor so that the winding pitch is approximately twice the pole pitch.

9. A motor as described in claim 8 further comprising a rotor winding head incorporated in the rotor.

10. A motor as described in claim 8 wherein the rotor iron and the stator field poles are composed of a ferrite material.

11. A motor as described in claim 8 wherein the spacing between said D.C. field poles is related to said winding pitch so that periodically one active conductor of each winding is opposite a direct field pole of one polarity and simultaneously the other active conductor of that winding is opposite a direct field pole of opposite polarity.

References Cited

UNITED STATES PATENTS

| 2,546,736 | 3/1951 | Fry et al. | 310—68.4 |
| 3,010,040 | 11/1961 | Braun | 310—112 |

FOREIGN PATENTS

| 935,265 | 8/1963 | Great Britain. |

ORIS L. RADER, *Primary Examiner.*

G. Z. RUBINSON, *Assistant Examiner.*